Patented Feb. 14, 1928.

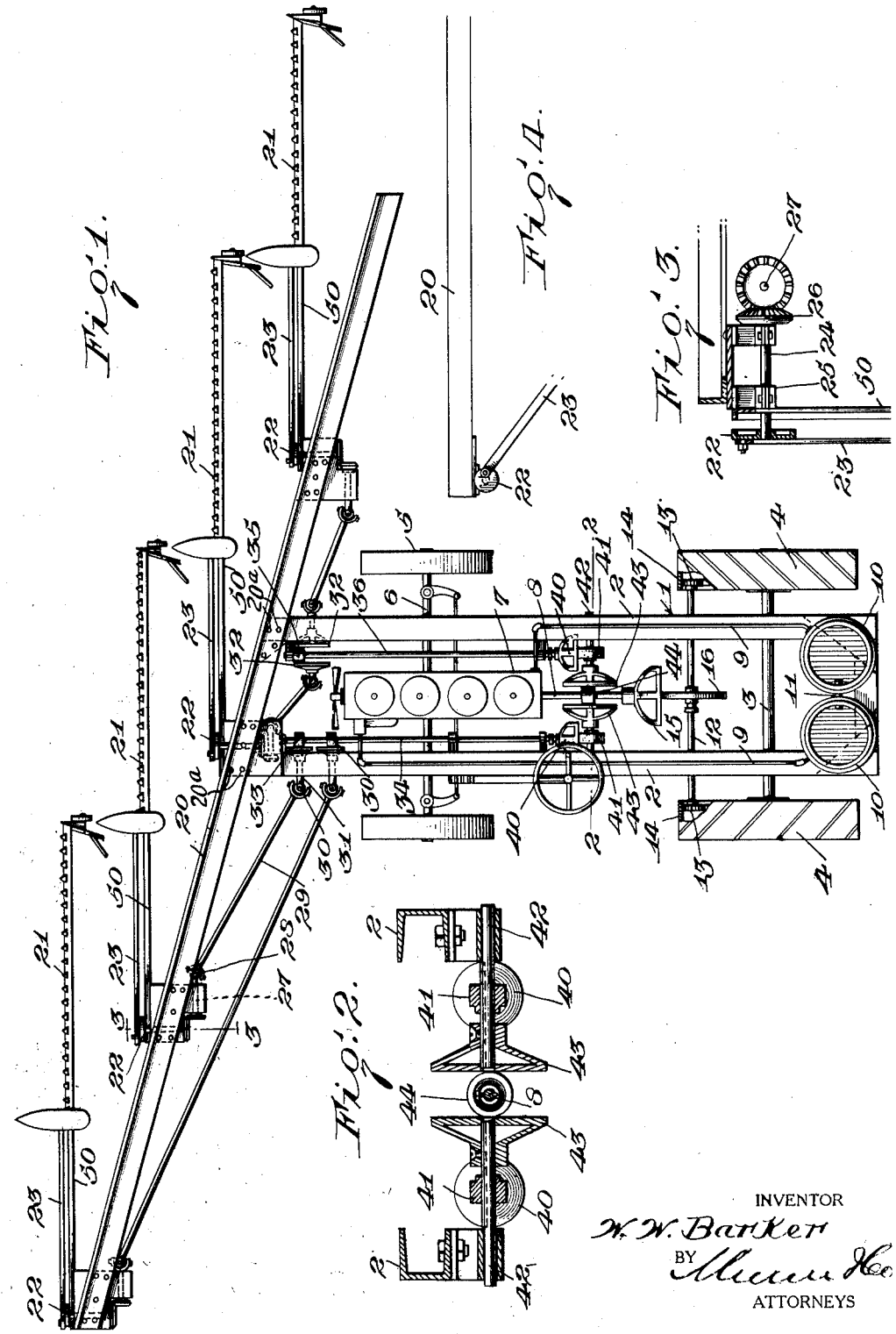

1,659,511

UNITED STATES PATENT OFFICE.

WILLIAM WORDEN BARKER, OF JONES CITY, OKLAHOMA.

MOWING MACHINE.

Application filed January 5, 1925. Serial No. 643.

The present invention aims to provide an improved mowing machine wherein a plurality of cutter bars are mounted and driven in such a novel and effective manner as to be capable of cutting a far greater amount of grain or the like in less time and with less expense than possible with machines heretofore proposed.

Another object of the invention resides in the provision of a mowing machine of this character designed to be organized with a tractor and susceptible of construction from instrumentalities and by means of facilities ordinarily available.

A further object resides in the provision of a mowing machine having the advantages and capacities mentioned and which is of simple and durable construction, reliable and efficient in operation and easy to control and operate.

Other objects and advantages reside in certain novel features of the construction, arrangement and combination of parts which will be hereinafter more fully described and more particularly pointed out in the appended claims, reference being had to the accompanying drawing, forming a part of this specification and in which:

Figure 1 is a plan view illustrating one embodiment of the invention;

Figure 2 is a view in section taken on line 2—2 of Figure 1;

Figure 3 is a view in section on line 3—3 of Figure 1; and

Figure 4 is a fragmentary view in front elevation showing how the crank and pitman are associated with the supporting member.

Referring to the drawings the numeral 1 designates generally a tractor which has a frame including side bars 2. A rear axle 3 is suitably connected with the frame of the tractor and on the axle 3 traction wheels 4 are mounted. Steering wheels 5 are provided adjacent the forward end of the frame, but the arrangement is such that the side bars 2 project forwardly beyond the steering wheels 5 and the front axle 6 with which the steering wheels 5 are associated.

The tractor also includes an engine 7 having an engine shaft 8 which may be made of sections coupled by a clutch and transmission. The engine is provided with a suitable water jacket which has connected therewith pipes 9 leading to barrels 10 designed to contain water. The barrels are connected by the pipe 11. The water circulates through the water jacket of the engine and through the pipes 9 and the barrels 10 and in the barrels 10 the water is cooled.

The rear wheels 4 of the tractor are driven by suitable gearing from the engine 7 and such gearing may comprise a transverse shaft 12 having pinions 13 meshing with internal gears 14 provided on the traction wheels. The shaft 12 is driven from the engine shaft by suitable gearing and in the arrangement shown this gearing comprises a driving friction gear 15 fixed to the engine shaft and a driven friction gear 16 slidable on the shaft 12 and engageable with the gear 15. For shifting the gear 16 along the shaft 12 a collar integral or fixed to the hub of the gear 16 has an annular groove with which a shifting fork not shown may be engaged and operated by any suitable means.

At the forward end of the frame of the tractor a supporting member 20 is mounted, the supporting member projecting beyond the side bars 2 and being inclined with respect to the longitudinal axis of the tractor. In the embodiment shown, the supporting member is fixed to the forward ends of the side bars 2 by rivets 20ᵉ. A plurality of cutters 21 are carried by the supporting member 20 and these cutters 21 are of conventional construction, and are arranged to present a continuous cutting mechanism transversely of the machine but are stepped longitudinally as shown in Figure 1. Cranks 22 and pitmen 23 are provided for reciprocating the knives of the cutters. The cranks and pitmen of all the cutters except one are arranged behind the adjacent cutters. Each crank 22 is fixed to the forward end of a short shaft 24 journaled in bearings 25 fixed to the supporting member 20. Each shaft 24 is driven by beveled gears 26 from a shaft 27 and the shafts 27 are connected by universal joints 28 to tumbling shafts 29. The tumbling shafts 29 are connected by universal joints 30 with shafts 31 on which driven friction disks 32 are alined and are engaged by pinions 33 slidable on a drive shaft 34 and may be actuated by suitable mechanism such as shifting forks and hand levers or the like. On the other side of the machine the disks 32 are arranged opposite each other and in confronting relation and are actuated by a single pinion 35 from a second drive shaft 36. The pinion 35 is also slidable on its shaft 36 and may be shifted on the shaft by suitable mechanism. It is to be understood by shifting the pinions across the faces of the various friction disks or gears the speed and the direction of the motion imparted to the various parts may be controlled. The drive shafts 34 and 36 have fixed thereto driven friction disks 40 which have pinions 41 cooperable therewith, pinions 41 being slidable on shaft 42. The shafts 42 have friction disks 43 affixed thereto and the disks 43 are actuated from a pinion 44 slidable on the drive shaft 8. The pinion 44 may be shifted along the shaft 8 and across the faces of the disks 43 by suitable mechanism. The shafts 34, 36 and 42 are mounted in suitable bearings provided therefor on the frame of the tractor.

The cutters 21 are elevated and controlled in any suitable manner and preferably braces 50 are provided for each cutter, the braces extending from the shafts 24 to the cutters.

With the mechanism described all of the cutters may be simultaneously driven as the machine moves forwardly and the cutting action is carried on a larger scale than heretofore proposed and with high efficiency. These advantages are had without the use of complicated and expensive mechanism so that not only is the first cost of the machine comparatively low, but the up-keep involves only a small expense and repairs may be made with facility.

I claim:

1. In a mowing machine, operating means for a plurality of cutters, comprising a driven shaft, two longitudinal shafts, means for operating the said shafts from the driven shaft, a plurality of crank shafts, shafts geared with the crank shafts, and means for operating the shafts geared with the crank shafts from the longitudinal shafts, said means including shafts geared with the longitudinal shafts and tumbling shafts having universal joint connections with the shafts geared with the longitudinal shafts and the shafts geared with the crank shafts.

2. In a mowing machine, operating mechanism for a plurality of cutters, comprising a driven shaft, two transverse shafts, friction gearing for operating the transverse shafts from the driven shaft, two longitudinally extending shafts, friction gearing for operating each longitudinal shaft from a transverse shaft, a plurality of crank shafts, a shaft geared with each crank shaft, friction gearing at the front ends of the longitudinal shafts, and tumbling shafts having universal joint connections with the shafts geared to the crank shafts and with the members of the friction gearing.

3. In a mowing machine of the character described, a wheel supported frame, an engine on the frame and having its shaft extending rearwardly, a transverse shaft having its ends geared with the rear wheels, friction gearing between the transverse shaft and engine shaft, two short transverse shafts, friction gearing between the said shafts and the engine shaft, two longitudinal shafts at opposite sides of the frame, friction gearing between each longitudinal shaft and a short transverse shaft, a plurality of crank shafts, and means for operating the crank shafts from the front ends of the longitudinal shafts, said means including friction gearing, shafts geared with the crank shafts and tumbling shafts connecting the friction gearing and the shafts geared with the crank shafts.

WILLIAM WORDEN BARKER.